UNITED STATES PATENT OFFICE.

CORNELIUS D. VREELAND, OF UPPER MONTCLAIR, NEW JERSEY.

METHOD OF PRODUCING ZINC ARSENITE.

1,296,344.　　　Specification of Letters Patent.　　Patented Mar. 4, 1919.

No Drawing.　　Application filed August 28, 1918. Serial No. 251,733.

*To all whom it may concern:*

Be it known that I, CORNELIUS D. VREELAND, a citizen of the United States, residing at Upper Montclair, in the county of Essex and State of New Jersey, have invented certain new and useful Improvements in Methods of Producing Zinc Arsenite, of which the following is a specification.

Zinc arsenite has been found to be a substance useful as an agricultural insecticide, and the object of this invention is to provide a method of manufacturing zinc arsenite which will not only be more economical than any method of producing it now known and which will be applicable to the materials of average quality now available, but which will result in zinc arsenite free of soluble arsenious oxid (which is injurious to vegetation) and possessing certain qualities desirable or essential to its successful use as an insecticide, for instance, a sufficiently fine state of division to insure its finding lodgment in the minute recesses of the foliage and other parts of the plants or trees, to enable it to be eaten by the insects, to keep it in a state of suspension in water for a suitable length of time, and to avoid its clogging or adhering to the apparatus for applying the insecticide mixture.

The usual method of producing arsenite of zinc is to precipitate a soluble salt of zinc, as the sulfate, by a solution of an alkaline arsenite, as zinc arsenite. This method not only involves indirectness of procedure, requiring the arsenic and zinc substances first to be reduced to the form of soluble salts thereof, but it results in a product which is known usually to possess a sufficient quantity of arsenious oxid in soluble form so that it cannot be applied with assurance of safety so far as injury to vegetation is concerned.

In order to produce zinc arsenite by a procedure of a more direct and simple character and insure the product being substantially free of soluble arsenious oxid, I have experimented with arsenious oxid and zinc oxid, and whereas I have found that these substances will not combine in water at ordinary temperatures, so as to produce arsenite of zinc by precipitation, if one of them be reduced to soluble form by heating it will react with the other in the presence of water, the precipitate resulting having, moreover, all the characteristics hereinbefore alluded to as those which make it suitable for use as an insecticide, and, in particular, being substantially free of soluble arsenious oxid.

My invention therefore broadly consists in the method of producing arsenite of zinc from arsenious oxid and zinc oxid which consists in reducing one of these oxids to soluble form by heating the same and causing it in such form to react with the other oxid in water, whereby to cause zinc arsenite to be precipitated.

In further experimenting, and particularly (after effecting the major reaction and consequent precipitation according to my invention as above outlined) upon subjecting a part of the supernatant liquid acidified with hydrochloric acid according to the usual hydrogen sulfid test and detecting soluble arsenic, and also subjecting another part of such liquid to the usual test for soluble zinc and detecting a slight amount of such soluble zinc, and concluding that, if the major reaction was not completed, at least the process of precipitation incident to the major reaction had not entirely spent itself, I further discovered that if caustic soda be added to the supernatant liquid such liquid may be entirely cleared of soluble zinc and soluble arsenic, whereby the process of precipitation would be entirely fulfilled (and the resulting precipitate would be perfectly free of soluble arsenious oxid) as shown by the hydrogen sulfid test.

My invention therefore further consists in the method hereinbefore stated supplemented by treating the solution after precipitation with a suitable alkali, as caustic soda.

I have found that the best procedure to follow in carrying out my invention is to boil the arsenious oxid in water for at least one-half an hour and then slowly sift into the boiling mix finely divided zinc oxid, meanwhile constantly stirring the mix, the boiling and stirring being preferably continued thereafter from three to five hours to insure as perfect reaction as possible. The proportions conducive to the best results are as follows: one part of arsenious oxid to one and five-tenths parts of zinc oxid, and one gallon of water to each two and one-half pounds of the oxids; the designated quantity of water should be maintained during the boiling. The proportions stated are for commercially pure oxids, and they may vary slightly according to the purity and physical conditions of the oxids. For instance, I have used one part of arsenious oxid to one and two-tenths parts of zinc oxid with good results. What occurs in the boiling of the two oxids is apparently the dissolving, till the point of saturation is reached, of one or both of the oxids and then the reaction of the solution of the one or each of them with the other, these steps occurring alternately and repeatedly, so that the entire action is of a progressive character. The arsenious oxid, it may be remarked, dissolves much more readily than the zinc oxid.

The precipitate resulting from this procedure, upon filtering off the liquid content and washing and drying such precipitate, will be found to have not only the desired state of fineness but the other qualities necessary for its use for insecticidal purposes, and in addition to be substantially free of soluble arsenious oxid.

In order to clear the liquid content, after the major reaction and precipitation incident to the foregoing procedure have been completed, of soluble arsenic and soluble zinc and produce a precipitate which will be entirely clear of these substances, I introduce into such liquid caustic soda in the proportion 100 CC. of 10 degrees Baumé to each 100 gallons of the mix. The supernatant liquid is then filtered off and the precipitate washed and dried. By this treatment I so completely remove the soluble arsenic that upon subjecting the filtrate, acidified with hydrochloric acid, to the hydrogen sulfid test neither a precipitate nor ever a yellow color, which indicates the presence of soluble arsenic, appears.

To effect the supplemental reaction other alkalis than caustic soda, such as lime water and caustic potash, may be employed.

Having thus fully described my invention, what I claim and desire to secure by Letters Patent is:

1. The hereindescribed method of producing zinc arsenite from arsenious oxid and zinc oxid which consists in reducing one of the oxids to soluble form by heating the same and causing it in such form to react with the other oxid in water, whereby to cause arsenite of zinc to be precipitated.

2. The hereindescribed method of producing zinc arsenite from arsenious oxid and zinc oxid which consists in reducing one of the oxids to soluble form by heating the same and causing it in such form to react with the other oxid in water, whereby to cause zinc arsenite to be precipitated, and subsequently introducing into the liquid content an alkali, whereby to clear the liquid content of soluble arsenic.

3. The hereindescribed method of producing zinc arsenite which consists in preparing a mix including, with water, arsenious oxid and zinc oxid and then heating such mix to a temperature sufficient to render one of the oxids soluble, whereby to cause it in soluble form to react with the other oxid and zinc arsenite to be precipitated.

4. The hereindescribed method of producing zinc arsenite which consists in preparing a mix including, with water, arsenious oxid and zinc oxid and then heating such mix to a temperature sufficient to render one of the oxids soluble, whereby to cause it in soluble form to react with the other oxid and zinc arsenite to be precipitated, and subsequently introducing into the liquid content an alkali, whereby to clear the liquid content of soluble arsenic.

5. The hereindescribed method of producing zinc arsenite which consists in preparing a mix including, with water, arsenious oxid and zinc oxid and then heating such mix to substantially the boiling point and maintaining it thereat until one of the oxids dissolves, whereby to cause the latter oxid in dissolved form to react with the other oxid and zinc arsenite consequently to be precipitated.

6. The hereindescribed method of producing zinc arsenite which consists in preparing a mix including, with water, arsenious oxid and zinc oxid and then heating such mix to substantially the boiling point and maintaining it thereat until one of the oxids dissolves, whereby to cause the latter oxid in dissolved form to react with the other oxid and zinc arsenite consequently to be precipitated, and subsequently introducing into the liquid content an alkali, whereby to clear the liquid content of soluble arsenic.

In testimony whereof I affix my signature.

CORNELIUS D. VREELAND.